(12) United States Patent
Arbona et al.

(10) Patent No.: US 11,466,585 B2
(45) Date of Patent: Oct. 11, 2022

(54) BLADE OUTER AIR SEAL ARRANGEMENT AND METHOD OF SEALING

(71) Applicant: United Technologies Corporation, Farmington, CT (US)

(72) Inventors: Jaime A. Arbona, West Palm Beach, FL (US); Carson A. Roy Thill, South Berwick, ME (US); Robin H. Fernandez, Litchfield, CT (US); Danielle Mahoney, Dover, NH (US); Andrew D. Keene, Portland, ME (US); Justin K. Bleil, Sandford, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 471 days.

(21) Appl. No.: 16/675,843

(22) Filed: Nov. 6, 2019

(65) Prior Publication Data

US 2021/0131300 A1 May 6, 2021

(51) Int. Cl.
*F01D 11/08* (2006.01)

(52) U.S. Cl.
CPC .......... *F01D 11/08* (2013.01); *F05D 2230/64* (2013.01); *F05D 2240/11* (2013.01); *F05D 2240/55* (2013.01); *F05D 2300/10* (2013.01)

(58) Field of Classification Search
CPC ... F01D 11/08; F05D 2240/11; F05D 2230/90
See application file for complete search history.

(56) References Cited

U.S. PATENT DOCUMENTS

| 8,579,580 | B2 | 11/2013 | Albers et al. | |
| 8,753,073 | B2 | 6/2014 | Albers et al. | |
| 8,834,105 | B2* | 9/2014 | Albers | F01D 25/12 |
| | | | | 415/173.1 |
| 9,518,474 | B2 | 12/2016 | Shapiro et al. | |
| 9,587,517 | B2* | 3/2017 | Vetters | F01D 11/08 |
| 9,845,697 | B2* | 12/2017 | Davis | F01D 25/246 |
| 9,863,265 | B2 | 1/2018 | Stapleton | |
| 9,874,104 | B2* | 1/2018 | Shapiro | F01D 25/246 |
| 10,088,049 | B2* | 10/2018 | Davis | F16J 15/0887 |
| 10,196,918 | B2* | 2/2019 | McCaffrey | F01D 11/08 |
| 10,385,718 | B2* | 8/2019 | O'Leary | F01D 11/24 |

(Continued)

FOREIGN PATENT DOCUMENTS

| JP | 2006144790 | 6/2006 |
| WO | 2016189215 | 12/2016 |
| WO | 2018172653 | 9/2018 |

OTHER PUBLICATIONS

Extended EP Search Report for EP Application No. 20206164.4 dated Apr. 13, 2021.

*Primary Examiner* — Eldon T Brockman
(74) *Attorney, Agent, or Firm* — Carlson, Gaskey & Olds, P.C.

(57) ABSTRACT

A flow path component assembly includes a flow path component having a plurality of segments that extend circumferentially about an axis and mounted in a support structure. At least one of the plurality of segments have a first wall and a second wall that extend radially outward from a base portion. The first wall is axially spaced from the second wall. A coating is on a portion of the first wall and a portion of the second wall. The coating is in contact with a feature on the support structure.

22 Claims, 4 Drawing Sheets

(56) References Cited

U.S. PATENT DOCUMENTS

| | | | | |
|---|---|---|---|---|
| 10,690,007 B2* | 6/2020 | Quennehen | ............ | F01D 11/08 |
| 2008/0220209 A1* | 9/2008 | Taylor | ....................... | C23C 4/18 |
| | | | | 428/338 |
| 2012/0171027 A1* | 7/2012 | Albers | .................. | F01D 11/005 |
| | | | | 415/208.1 |
| 2015/0377069 A1 | 12/2015 | Landwehr | | |
| 2016/0208632 A1* | 7/2016 | Davis | ................... | F01D 11/005 |
| 2016/0251982 A1* | 9/2016 | Shapiro | ................ | F01D 25/246 |
| | | | | 415/134 |
| 2017/0016341 A1 | 1/2017 | Stapleton et al. | | |
| 2017/0037740 A1* | 2/2017 | O'Leary | ................ | F01D 11/12 |
| 2017/0350268 A1* | 12/2017 | McCaffrey | ............. | F01D 11/08 |
| 2018/0156069 A1* | 6/2018 | Quennehen | ............ | F01D 11/08 |

\* cited by examiner

BLADE OUTER AIR SEAL ARRANGEMENT AND METHOD OF SEALING

BACKGROUND

This application relates to a blade outer air seal arrangement and method of sealing a blade outer air seal assembly.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Some gas turbine engine components are formed from ceramic materials.

SUMMARY OF THE INVENTION

In one exemplary embodiment, a flow path component assembly includes a flow path component having a plurality of segments that extend circumferentially about an axis and mounted in a support structure. At least one of the plurality of segments have a first wall and a second wall that extend radially outward from a base portion. The first wall is axially spaced from the second wall. A coating is on a portion of the first wall and a portion of the second wall. The coating is in contact with a feature on the support structure.

In a further embodiment of any of the above, the coating is a silicon metal coating.

In a further embodiment of any of the above, the coating extends to at least part of the base portion.

In a further embodiment of any of the above, the feature is a rounded protrusion that extends in an axial direction.

In a further embodiment of any of the above, the feature contacts the second wall.

In a further embodiment of any of the above, a w-seal contacts the coating.

In a further embodiment of any of the above, the w-seal contacts the coating on the first wall.

In a further embodiment of any of the above, a seal plate abuts the support structure and contacts the w-seal.

In a further embodiment of any of the above, a seal plate contacts the coating.

A w-seal is arranged between the support structure and the seal plate.

In a further embodiment of any of the above, the coating is machined to provide a smooth contact area.

In a further embodiment of any of the above, the coating is machined to provide dimensional control.

In a further embodiment of any of the above, the at least one segment has a first aperture and the support structure has a second aperture. A pin extends through the first and second apertures.

In a further embodiment of any of the above, the at least one segment is formed from a ceramic material.

In one exemplary embodiment, a method of assembling a flow path component assembly includes providing a component segment that has a first wall and a second wall that extends radially outward from a base portion. The first wall is axially spaced from the second wall. A coating is applied to a portion of the segment. The coating is machined to form a smooth contact surface. The segment is mounted to a support structure such that a feature on the support structure contacts the smooth contact surface.

In a further embodiment of any of the above, the coating is a silicon metal coating.

In a further embodiment of any of the above, the coating is applied to a portion of the first wall and a portion of the second wall.

In a further embodiment of any of the above, the coating is machined on the second wall to form the smooth contact surface. The coating on the first wall is machined to form a second smooth contact surface.

In a further embodiment of any of the above, a w-seal is arranged in contact with the second smooth contact surface.

In a further embodiment of any of the above, the mounting the segment to the support structure comprises inserting a pin through a first aperture on the segment and a second aperture on the support structure.

In a further embodiment of any of the above, the segment is formed from a ceramic material.

DETAILED DESCRIPTION

Figure 1:
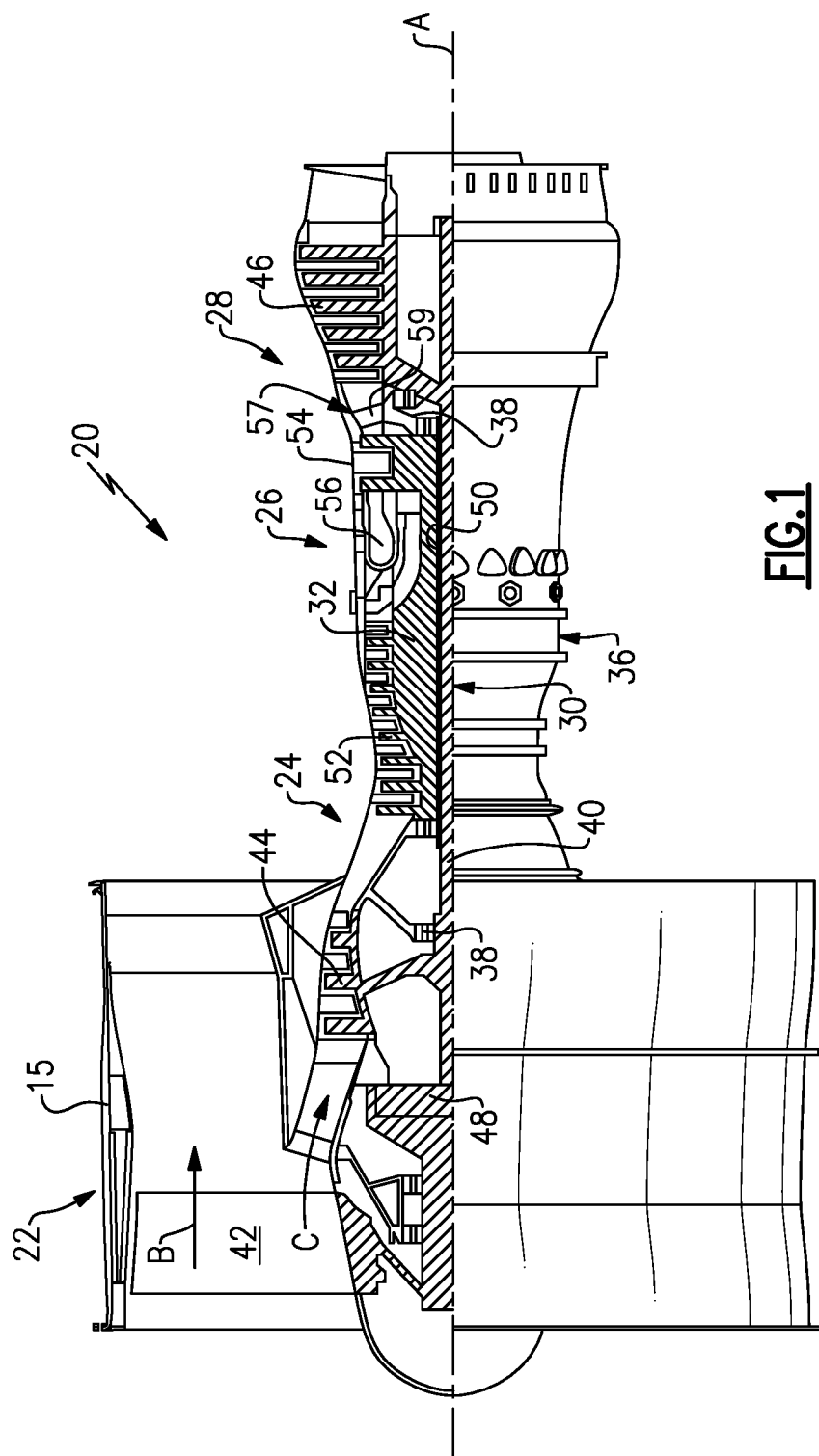
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
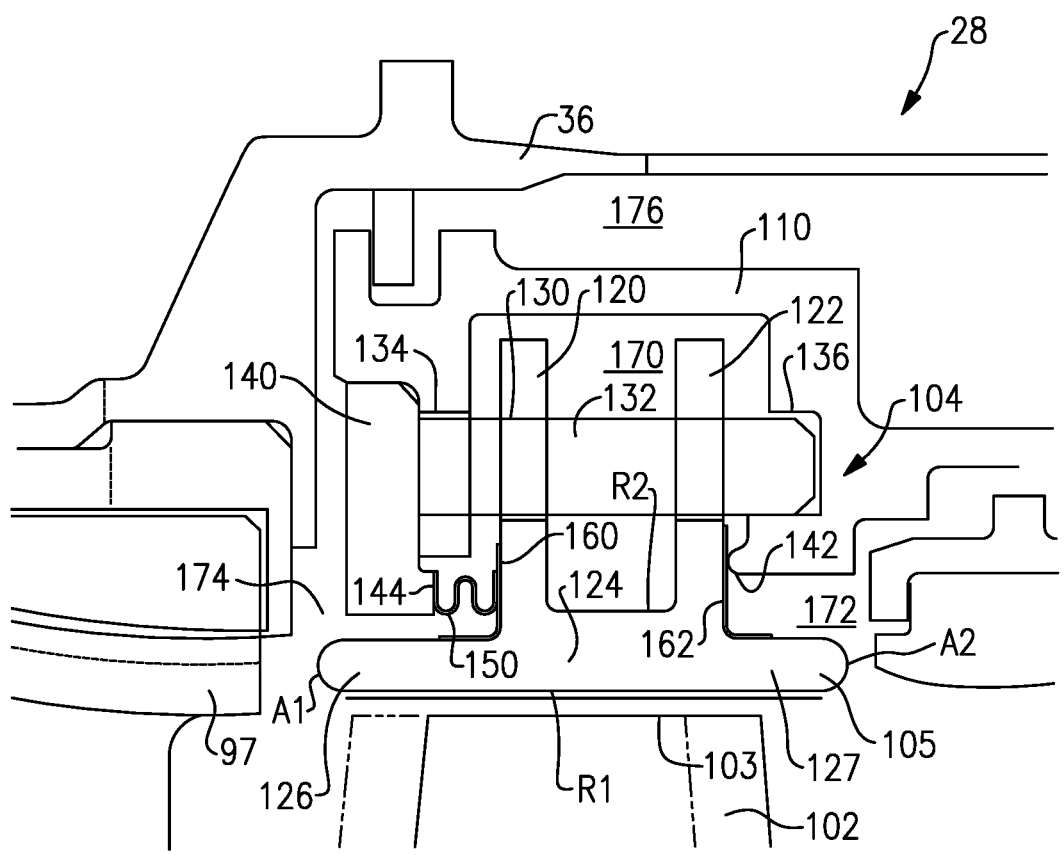
FIG. 2 schematically illustrates an example turbine section having a blade outer air seal assembly.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure. The turbine section 28 includes a plurality of alternating turbine blades 102 and turbine vanes 97.

A turbine blade 102 has a radially outer tip 103 that is spaced from a blade outer air seal ("BOAS") assembly 104. The BOAS assembly 104 may include a plurality of seal segments 105 that are circumferentially arranged in an annulus about the central axis A of the engine 20.

The BOAS segments 105 may be mounted to an engine case or structure, such as engine static structure 36 via a control ring or support structure 110. The support structure 110 may extend for a full 360° about the engine axis A. The engine case or support structure holds the BOAS segments 105 radially outward of the turbine blades 102. Although a BOAS assembly 104 is described, this disclosure may apply to other components, and particularly flow path components. For example, this disclosure may apply to combustor liner panels, shroud, transition ducts, exhaust nozzle liners, or other CMC components.

Each seal segment 105 is a body that defines radially inner and outer sides R1, R2, respectively, and first and second axial sides A1, A2, respectively. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In the illustrated example, each BOAS segment 105 includes a first wall 120 axially spaced from a second wall 122. The first and second walls 120, 122 extend generally radially outward from a base portion 124. The first and second walls 120, 122 may extend along an entire circumferential length of the seal segment 105, or may terminate circumferentially inward of the base portion 124. In this example, the first and second walls 120, 122 are generally parallel to one another and perpendicular to the base portion 124. In other examples, the first and second walls 120, 122 may be angled. An aperture 130 extends through the first and second walls 120, 122, and receives a pin 132 for securing the seal segment 105 to a support structure 110. In some examples, multiple apertures 130 circumferentially spaced apart extend through the first and second walls 120, 122.

The base portion 124 extends between the first and second axial sides A1, A2 and defines a gas path on a radially inner side and a non-gas path on a radially outer side. The first wall 120 is spaced from the first axial side A1 to form a forward portion 126, and the second wall 122 is spaced from the second axial side A2 to form an aft portion 127. In this disclosure, forward, aft, upstream, downstream, axial, radial, or circumferential is in relation to the engine axis A unless stated otherwise.

The BOAS segments 105 may be formed of a ceramic matrix composite ("CMC") material. Each seal segment 105 is formed of a plurality of CMC laminate sheets. The laminate sheets may be silicon carbide fibers, formed into a braided or woven fabric in each layer. In other examples, the BOAS segments 105 may be made of a monolithic ceramic.

CMC components such as BOAS segments 105 are formed by laying fiber material, such as laminate sheets or braids, in tooling, injecting a gaseous infiltrant into the tooling, and reacting to form a solid composite component. The component may be further processed by adding additional material to coat the laminate sheets. In some examples, the base portion 124 and first and second walls 120, 122 may be formed from the same number of laminate plies, and thus have substantially the same thickness. The simple arrangement of the base portion 124 and first and second walls 120, 122 allows for a simple ply layup.

The seal segment 105 is received radially within the support structure 110, and secured in position by a pin 132 that extends through the support structure 110 and through the first and second walls 120, 122. The pin 132 extends through the aperture 130 on the BOAS segment 105 and through an aperture 134 on the support structure 110. The pin 132 retains the BOAS segment 105 in the circumferential and radial directions. A seal plate 140 may secure the pin 132 in place. The seal plate 140 may secure to the support structure 110 or other engine structure via a snap fit, for example.

The seal segment 105 has a coating at a first portion 160 and a second portion 162. The coating may be a silicon metal coating. In one example, the coating may be an Air Plasma Spray (APS) silicon metal coating. The coating bonds well to the CMC material, and behaves similarly to CMC under varying temperatures. The first portion 160 is on the first wall 120, and the second portion 162 is on the second wall 122. In some examples, the first portion 160 and/or the second portion 162 may extend onto the base portion 124. The coating may be machined to provide a smooth sealing area. The machined silicon metal coating may provide a smoother surface than CMC for sealing. The coating may also be machined to tightly controlled dimensions and mitigate surface tolerance variation.

The support structure 110 has a rounded feature 142 that protrudes axially toward the BOAS segment 105. The feature 142 may be machined into the support structure 110, for example. The feature 142 contacts the coating. In the illustrated example, the feature 142 contacts the coating at the second portion 162 on the second wall 122. The rounded shape of the feature 142 may provide line contact between the support structure 110 and the BOAS segment 105, which may minimize heat transfer between the support structure 110 and the BOAS segment 105. Case feature 142 could be omitted in another embodiment where a local case surface could be flat or have another shape.

A W-seal 150 may be arranged between the BOAS segment 105 and the seal plate 140. The W-seal 150 contacts the seal plate 140 at a point 144, which may be radially inward of the support structure 110. In the illustrated example, the W-seal 150 contacts the coating at the first portion 160 on the first wall 120. The W-seal 150 biases the BOAS segment 105 axially to keep the BOAS segment 105 seated against the feature 142.

The assembly 104 forms several cavities having air at different pressures. For example, high pressure air may be at locations 170 and 176, while lower pressure air is present at locations 172 and 174. The sealing provided by the feature 142 and the w-seal 150 in contact with the coating at portions 160, 162 prevents leakage between these high and low pressure locations.

Figure 3:
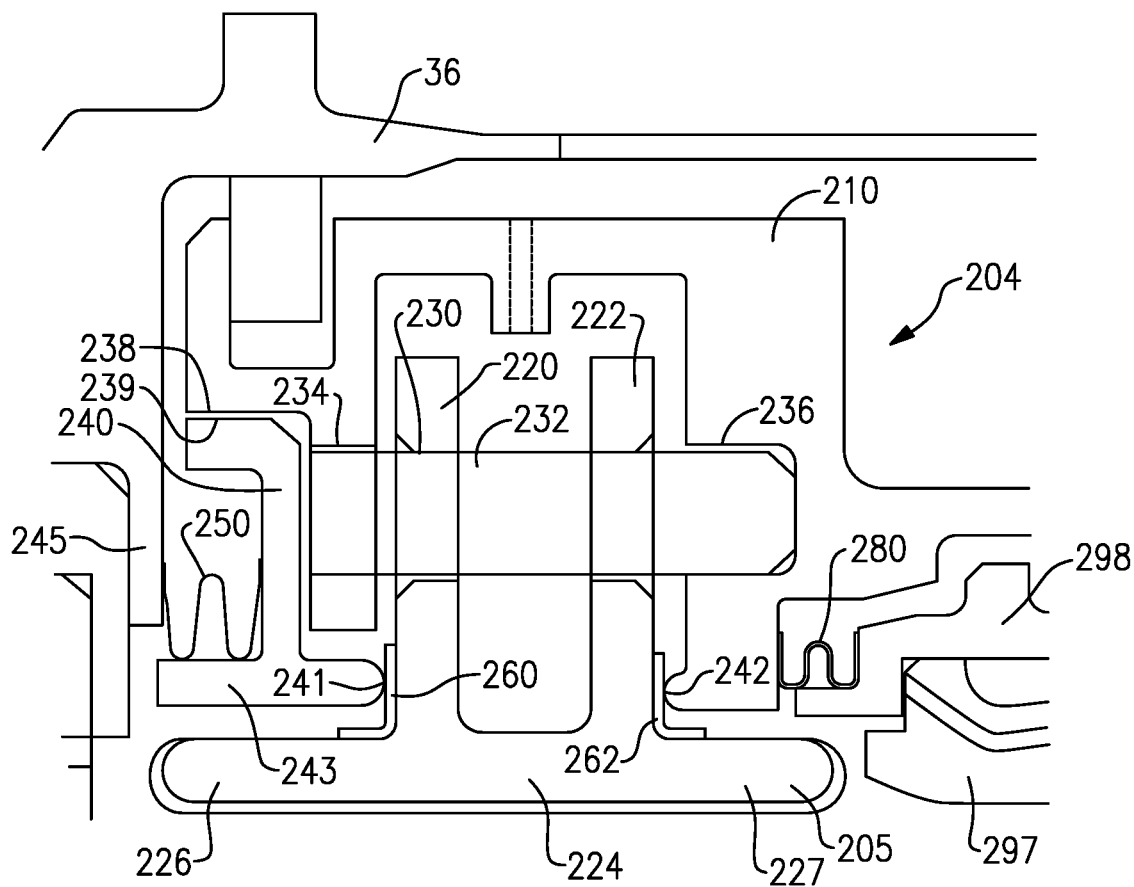
FIG. 3 schematically illustrates an example turbine section having another exemplary blade outer air seal assembly.

FIG. 3 illustrates another example BOAS assembly 204. In this example, the seal plate 240 has a radial inner portion 243 that forms a rounded feature 241. The seal plate 240 may provide a land 243 that positions a W-seal 250 radially. The seal plate 240 is positioned by a land 239, which is tightly clearance to land 238 on the support structure 210. The rounded features 241 contacts the coating at the first portion 260, while the rounded feature 242 on the support structure 210 contacts the coating at the second portion 262. The W-seal 250 is arranged between the seal plate 240 and a portion 245 of an engine structure, such as engine structure 36. In this example, the seal plate 240 is not snapped into a supporting structure, and is instead biased axially by the W-seal 250. The W-seal 250 biases the seal plate 240 into contact with the BOAS segment 105, which biases the BOAS segment 105 into contact with the feature 242. In some examples, a second W-seal 280 may be used aft of the feature 242. The second W-seal 280 may be arranged between the support structure 210 and a structure 298 of a vane assembly 297, for example.

Figure 4:
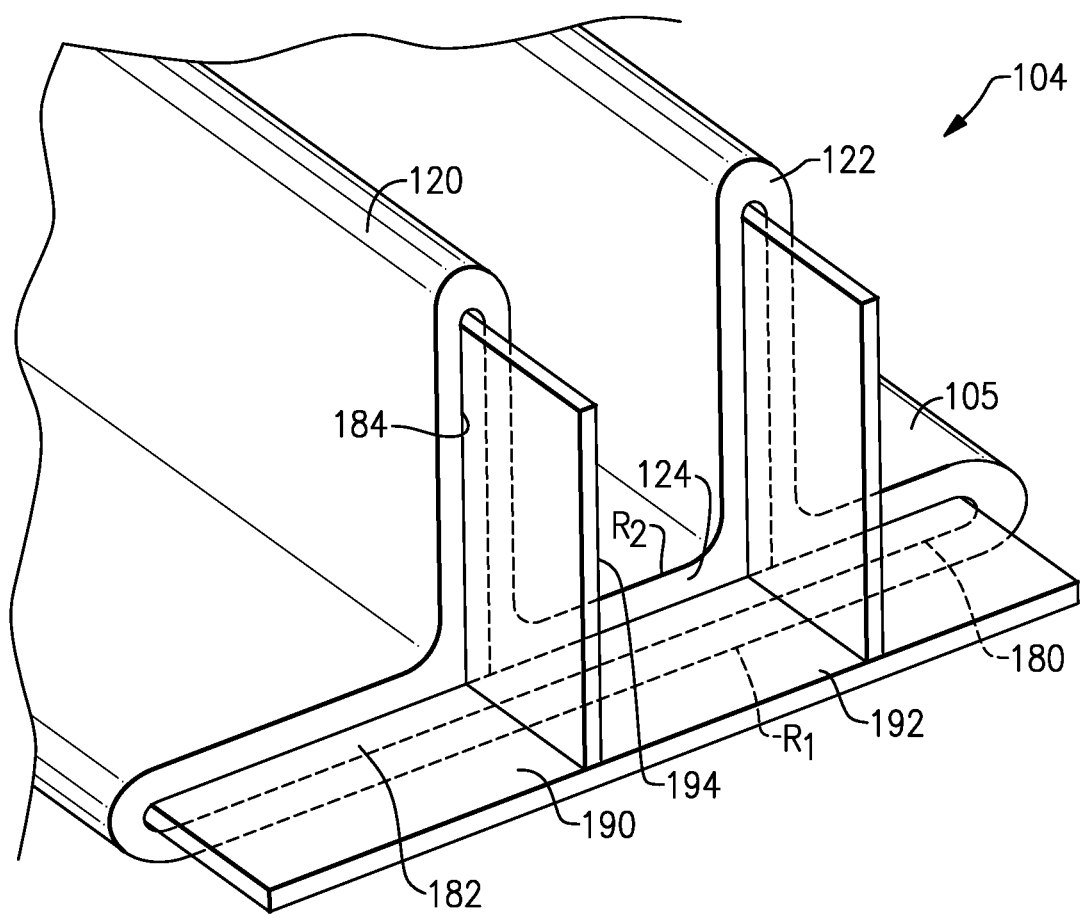
FIG. 4 illustrates a side view of an example blade outer air seal assembly.

FIG. 4 illustrates a side view of an example BOAS assembly 104. The blade outer air seal assembly 104 includes a feather seal slot 180. The feather seal slot 180 may be about halfway between the radially inner and outer sides R1, R2 of each BOAS segment 105, for example. The slot 180 may include an axial portion 182 and a radial portion 184. The radial portion 184 may extend up one or both of the walls 120, 122. The axial portion 182 may extend into the base portion 124 forward and aft of the walls 120, 122, for example. A feather seal 190 may be arranged in the slot 180. The feather seal 190 may include an axial portion 192 and a radial portion 194 to engage with the axial and radial portions 182, 184 of the slot 180, for example. The axial portion 192 and radial portions 194 may be a single unitary piece, or may separate pieces. Although a particular feather seal 190 is shown, other intersegment seal configurations may be utilized. The feather seal 190 may be a metallic component, for example. An intersegment seal, such as the feather seal 190 may be used in combination with the forward and aft sealing embodiments described above.

BOAS require sealing between secondary flow paths and the gas path in order to maintain BOAS supply pressure and to minimize leakage. The disclosed arrangement provides axial sealing on both the front and rear sides of the BOAS, and may be used with intersegment seals between adjacent BOAS segments. The machinable coating provides a high surface finish which may improve sealing performance at front and rear sealing points. Machining the coating also allows for tighter tolerance control of the axial width of the BOAS, which may improve the distribution of contact between the W-seal and the BOAS segments for proper sealing. The W-seal provides a preload that maintains the BOAS segment in contact with the rounded support structure feature. The W-seal and rounded feature provide minimized surface area of the BOAS exposed to high velocity cooling air, which may impart high thermal stress on the BOAS segment. The disclosed arrangement provides a low-complexity sealing solution for a CMC BOAS.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A flow path component assembly, comprising:
a flow path component having a plurality of segments extending circumferentially about an axis and mounted in a support structure;
at least one of the plurality of segments having a first wall and a second wall extending radially outward from a base portion, the first wall axially spaced from the second wall;
a coating on a portion of the first wall and a portion of the second wall;
wherein the coating is in contact with a feature on the support structure, and the feature is a rounded protrusion that extends in an axial direction; and
wherein a w-seal contacts the coating.

2. The flow path component assembly of claim 1, wherein the coating is a silicon metal coating.

3. The flow path component assembly of claim 1, wherein the coating extends to at least part of the base portion.

4. The flow path component assembly of claim 1, wherein the feature contacts the second wall.

5. The flow path component assembly of claim 4, wherein the w-seal contacts the coating on the first wall.

6. The flow path component assembly of claim 1, wherein a w-seal contacts the coating.

7. The flow path component assembly of claim 6, wherein the w-seal contacts the coating on the first wall.

8. The flow path component assembly of claim 6, wherein a seal plate abuts the support structure and contacts the w-seal.

9. The flow path component assembly of claim 1, wherein the coating is machined to provide a smooth contact area.

10. The flow path component assembly of claim 1, wherein the coating is machined to provide dimensional control.

11. The flow path component assembly of claim 1, wherein the at least one segment has a first aperture and the support structure has a second aperture, and a pin extends through the first and second apertures.

12. The flow path component assembly of claim 11, wherein the at least one segment comprises a ceramic material.

13. The flow path component assembly of claim 1, wherein the at least one segment is formed from a ceramic material.

14. A method of assembling a flow path component assembly, comprising:
providing a component segment having a first wall and a second wall extending radially outward from a base portion, the first wall axially spaced from the second wall;
applying a coating to a portion of the segment, comprising applying the coating to a portion of the first wall and a portion of the second wall;
machining the coating to form a smooth contact surface; and
mounting the segment to a support structure such that a feature on the support structure contacts the smooth contact surface.

15. The method of claim 14, wherein the coating is a silicon metal coating.

16. The method of claim 14, comprising machining the coating on the second wall to form the smooth contact surface and machining the coating on the first wall to form a second smooth contact surface.

17. The method of claim 16, comprising arranging a w-seal in contact with the second smooth contact surface.

18. The method of claim 16, wherein the feature is a rounded protrusion that extends in an axial direction.

19. The method of claim 14, wherein the mounting the segment to the support structure comprises inserting a pin through a first aperture on the segment and a second aperture on the support structure.

20. The method of claim 14, wherein the segment is formed from a ceramic material.

21. A flow path component assembly, comprising:
a flow path component having a plurality of segments extending circumferentially about an axis and mounted in a support structure;
at least one of the plurality of segments having a first wall and a second wall extending radially outward from a base portion, the first wall axially spaced from the second wall;
a coating on a portion of the first wall and a portion of the second wall;
wherein the coating is in contact with a feature on the support structure, and the feature is a rounded protrusion that extends in an axial direction; and
wherein a seal plate contacts the coating and a w-seal is arranged axially between the support structure and the seal plate.

22. The flow path component assembly of claim 21, wherein the at least one segment comprises a ceramic material.

* * * * *